(12) United States Patent
Sato et al.

(10) Patent No.: US 10,886,519 B2
(45) Date of Patent: Jan. 5, 2021

(54) CONDUCTOR MODULE FOR TERMINAL

(71) Applicant: Yazaki Corporation, Tokyo (JP)

(72) Inventors: Katsunori Sato, Shizuoka (JP); Takuto Goto, Shizuoka (JP); Shinichi Yanagihara, Shizuoka (JP); Yoshiaki Ichikawa, Shizuoka (JP); Takao Shoji, Shizuoka (JP)

(73) Assignee: YAZAKI CORPORATION, Minato-ku (JP)

( * ) Notice: Subject to any disclaimer, the term of this patent is extended or adjusted under 35 U.S.C. 154(b) by 110 days.

(21) Appl. No.: 16/414,270

(22) Filed: May 16, 2019

(65) Prior Publication Data

US 2019/0273239 A1    Sep. 5, 2019

Related U.S. Application Data

(63) Continuation of application No. PCT/JP2017/045380, filed on Dec. 18, 2017.

(30) Foreign Application Priority Data

Dec. 19, 2016 (JP) .................................. 2016-245831

(51) Int. Cl.
*H01M 10/48* (2006.01)
*H01M 2/20* (2006.01)
(Continued)

(52) U.S. Cl.
CPC ............. *H01M 2/206* (2013.01); *H01M 2/10* (2013.01); *H01M 2/20* (2013.01); *H01M 2/34* (2013.01);
(Continued)

(58) Field of Classification Search
CPC ...... H01M 2/206; H01M 2/202; H01M 2/204; H01M 2/10; H01M 2/20; H01M 2/34;
(Continued)

(56) References Cited

U.S. PATENT DOCUMENTS 8,802,275 B2    8/2014  Kim
2011/0045329 A1    2/2011  Ikeda et al.
(Continued)

FOREIGN PATENT DOCUMENTS

JP    2010-238516 A    10/2010
JP    2011-040335 A    2/2011
(Continued)

OTHER PUBLICATIONS

Japanese Office Action issued in JP 2016-245831 dated Feb. 22, 2019.
(Continued)

*Primary Examiner* — Raymond Alejandro
(74) *Attorney, Agent, or Firm* — Sughrue Mion, PLLC (57) ABSTRACT

A conductor module for terminal includes a bus bar, a state detector including a detection conductor, and a fixing member fixing the state detector to the bus bar. The bus bar includes a connection surface to which the detection conductor is electrically connected, and two fixing holes formed with the placed state detector interposed therebetween. The fixing member includes a main body that the state detector is made contact with, and plastically deformable fixing legs. Each of the fixing legs is inserted in the fixing hole from the connection surface side and projects from the fixed surface. In a fixed state, when the fixing leg is seen from an axis direction of the fixing hole, a tip of the fixing leg is disposed on the outside in a radial direction than the fixing holes.

17 Claims, 8 Drawing Sheets

(51) Int. Cl.
  *H01M 2/34* (2006.01)
  *H01R 4/06* (2006.01)
  *H01R 4/48* (2006.01)
  *H01R 11/28* (2006.01)
  *H01M 2/10* (2006.01)

(52) U.S. Cl.
  CPC ......... *H01M 10/48* (2013.01); *H01M 10/482* (2013.01); *H01R 4/06* (2013.01); *H01R 4/48* (2013.01); *H01R 11/288* (2013.01)

(58) Field of Classification Search
  CPC ...... H01M 2/30; H01M 10/48; H01M 10/482; H01R 4/06; H01R 4/48; H01R 4/481; H01R 4/489; H01R 11/288; H01R 11/287; H01R 11/281
  See application file for complete search history.

(56) References Cited

U.S. PATENT DOCUMENTS

| | | | | |
|---|---|---|---|---|
| 2013/0330579 A1* | 12/2013 | Ejiri | .................... | H01M 2/1223 429/53 |
| 2014/0176141 A1* | 6/2014 | Takatsuji | ............ | H01M 10/486 324/426 |
| 2015/0064524 A1 | 3/2015 | Noh et al. | | |
| 2015/0349390 A1* | 12/2015 | Aiba | .................. | H01M 10/482 429/90 |
| 2015/0372354 A1 | 12/2015 | Nakano et al. | | |
| 2016/0043366 A1* | 2/2016 | Suzuki | .................. | H01M 2/024 429/156 |
| 2016/0172652 A1 | 6/2016 | Ichikawa et al. | | |

FOREIGN PATENT DOCUMENTS

| | | |
|---|---|---|
| JP | 2012-038558 A | 2/2012 |
| JP | 2012-059658 A | 3/2012 |
| JP | 5223607 B2 | 6/2013 |
| JP | 2013-175432 A | 9/2013 |
| JP | 2015-041586 A | 3/2015 |
| JP | 2015-050186 A | 3/2015 |
| JP | 2016-115545 A | 6/2016 |
| JP | 2016-207549 A | 12/2016 |
| KR | 10-2013-0011659 A | 1/2013 |
| WO | 2012/053581 A1 | 4/2012 |
| WO | 2014/122905 A1 | 8/2014 |
| WO | 2016/069095 A1 | 5/2016 |

OTHER PUBLICATIONS

International Search Report of PCT/JP2017/045380 dated Jan. 30, 2018.

* cited by examiner

CONDUCTOR MODULE FOR TERMINAL

CROSS-REFERENCE TO RELATED APPLICATION(S)

This application is a continuation application of International Application PCT/JP2017/045380, filed on Dec. 18, 2017, which claims priority to Japanese Patent Application No. 2016-245831, filed on Dec. 19, 2016 and designating the U.S., the entire contents of which are incorporated herein by reference.

BACKGROUND OF THE INVENTION

1. Field of the Invention

The present invention relates to a conductor module for terminal.

2. Description of the Related Art

There has been a conductor module for terminal used for a battery module that includes a plurality of battery cells. The conductor module for terminal includes, for example, a bus bar that is electrically connected to either of two electrode terminals in a battery cell and is electrically connected to electrode terminals in adjacent battery cells, and a voltage detector that includes a detection conductor for detecting a voltage of a battery cell (see Japanese Patent No. 5223607).

In the conductor module for terminal, a connecting unit that electrically connects a bus bar and a detection conductor to each other is formed by applying soldering, welding, and the like to the detection conductor placed on the bus bar.

A connecting unit is usually exposed to the outside. When an external force works on the connecting unit, the connecting unit may be damaged and connection reliability of a conductor module for terminal may be reduced. When the conductor module for terminal is directly attached to a battery module, a bus bar is strongly fixed to an electrode terminal. However, a voltage detection line is exposed to the outside and an external force may work on the voltage detection line. When an external force works on a voltage detection line, for example, a pulling force in an extension direction of the voltage detection line and a removing force against a bus bar at a connecting unit in a direction that the voltage detection line is separated from the bus bar work on the voltage detection line, connection reliability of the conductor module for terminal is reduced. Thus, in some cases, the conductor module for terminal can be housed in a housing case for preventing a voltage detection line from being exposed to the outside.

SUMMARY OF THE INVENTION

In view of the foregoing, an object of the present invention is to provide a conductor module for terminal capable of preventing reduction in connection reliability of a detection conductor to a connection conductor.

In order to achieve the above mentioned object, a conductor module for terminal according to one aspect of the present invention includes at least one or more connection conductor that is electrically connected to either of two electrode terminals of a battery cell in a battery module including a plurality of the battery cells; a state detector that includes a detection conductor electrically connecting at least the one or more connection conductor and a state detecting device detecting a state of the battery cell to which the connection conductor is electrically connected to each other; and a fixing member that fixes the state detector to at least the one or more connection conductor, wherein the connection conductor includes: a connection surface on which a part of the state detector is placed and to which the detection conductor is electrically connected; a fixed surface that faces the connection surface; and at least two or more fixing holes that penetrate through the connection surface and the fixed surface and are formed with the placed state detector interposed between the at least two or more fixing holes, the state detector includes an insulator that covers the detection conductor, the insulator includes a plate-shaped portion facing the fixed surface, the plate-shaped portion has through-holes each corresponding to the fixing holes, the fixing member includes: a main body that the state detector is made contact with; and a plurality of fixing legs that each project from the main body and correspond to the respective fixing holes, each of the fixing legs that is plastically deformable by an external force, is inserted in corresponding one of the fixing holes from the connection surface side and projects from the fixed surface, in a fixed state where the state detector is fixed to the connection conductor by the fixing member, when seen from an axis direction of the fixing hole, a tip of the fixing leg is disposed on the outside in a radial direction with respect to the fixing hole, and each of the fixing legs is, in the fixed state, inserted in the fixing hole and the through-hole.

In order to achieve the above mentioned object, a conductor module for terminal according to another aspect of the present invention includes at least one or more connection conductor that is electrically connected to either of two electrode terminals of a battery cell in a battery module including a plurality of the battery cells; a state detector that includes a detection conductor electrically connecting at least the one or more connection conductor and a state detecting device detecting a state of the battery cell to which the connection conductor is electrically connected to each other; and a fixing member that fixes the state detector to at least the one or more connection conductor, wherein the connection conductor includes: a connection surface on which a part of the state detector is placed and to which the detection conductor is electrically connected; a fixed surface that faces the connection surface; and at least two or more fixing holes that penetrate through the connection surface and the fixed surface and are formed with the placed state detector interposed between the at least two or more fixing holes, the fixing member includes: a main body that the state detector is made contact with; and a plurality of fixing legs that each project from the main body and correspond to the respective fixing holes, each of the fixing legs that is plastically deformable by an external force, is inserted in corresponding one of the fixing holes from the connection surface side and projects from the fixed surface, in a fixed state where the state detector is fixed to the connection conductor by the fixing member, when seen from an axis direction of the fixing hole, a tip of the fixing leg is disposed on the outside in a radial direction with respect to the fixing hole, and when seen from an axis direction of the fixing hole, a diameter of the tip is larger than a diameter of the fixing hole.

According to still another aspect of the present invention, in the conductor module for terminal, it is preferable that the main body is made contact with the insulator in the fixed state.

According to still another aspect of the present invention, in the conductor module for terminal, it is preferable that the state detector includes an insulator that covers the detection conductor, and the main body is made contact with the insulator in the fixed state.

According to still another aspect of the present invention, in the conductor module for terminal, it is preferable that the main body has a rib formed on a facing surface facing the connection surface in the fixed state, the rib projecting at least to the state detector side.

According to still another aspect of the present invention, in the conductor module for terminal, it is preferable that the fixing member is formed of a synthetic resin having thermoplasticity, and the tip is disposed so as to surround the outer periphery of the fixing hole when seen from the axis direction of the fixing hole.

In order to achieve the above mentioned object, a conductor module for terminal according to still another aspect of the present invention includes at least one or more connection conductor that is electrically connected to either of two electrode terminals of a battery cell in a battery module including a plurality of the battery cells; a state detector that includes a detection conductor electrically connecting at least the one or more connection conductor and a state detecting device detecting a state of the battery cell to which the connection conductor is electrically connected to each other; and a fixing member that fixes the state detector to at least the one or more connection conductor and has conductivity and elasticity, wherein the connection conductor includes: a placing surface on which a placing portion that is a part of the state detector is placed; a connection surface that faces the placing surface and to which the fixing member is electrically connected; and at least two or more fixing holes that penetrate through the placing surface and the connection surface and are formed with the placed state detector interposed between the at least two or more fixing holes, the placing portion has through-holes each corresponding to the fixing holes formed and has the detection conductor exposed to the outside on a side opposite to the placing surface side, the fixing member includes: a main body that includes a contacting portion contacting, in a fixed state where the state detector is fixed to the connection conductor by the fixing member, the detection conductor being exposed to the outside while being pressed by elastic deformation of the fixing member; and fixing legs that project from the main body and correspond to the respective fixing holes, and each of the fixing legs that is plastically deformable by an external force, is inserted in corresponding one of the through-holes and corresponding one of the fixing holes and projects from the connection surface, and when seen from an axis direction of the fixing hole, a tip of the fixing leg is disposed on the outside in a radial direction with respect to the fixing hole.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Embodiments according to the present invention will now be described with reference to the accompanying drawings. It should be noted that the embodiments below are not intended to limit this invention. Components in the embodiments include components that can be replaced and are facilitated by the skilled person or substantially like components.

First Embodiment

Figure 1:
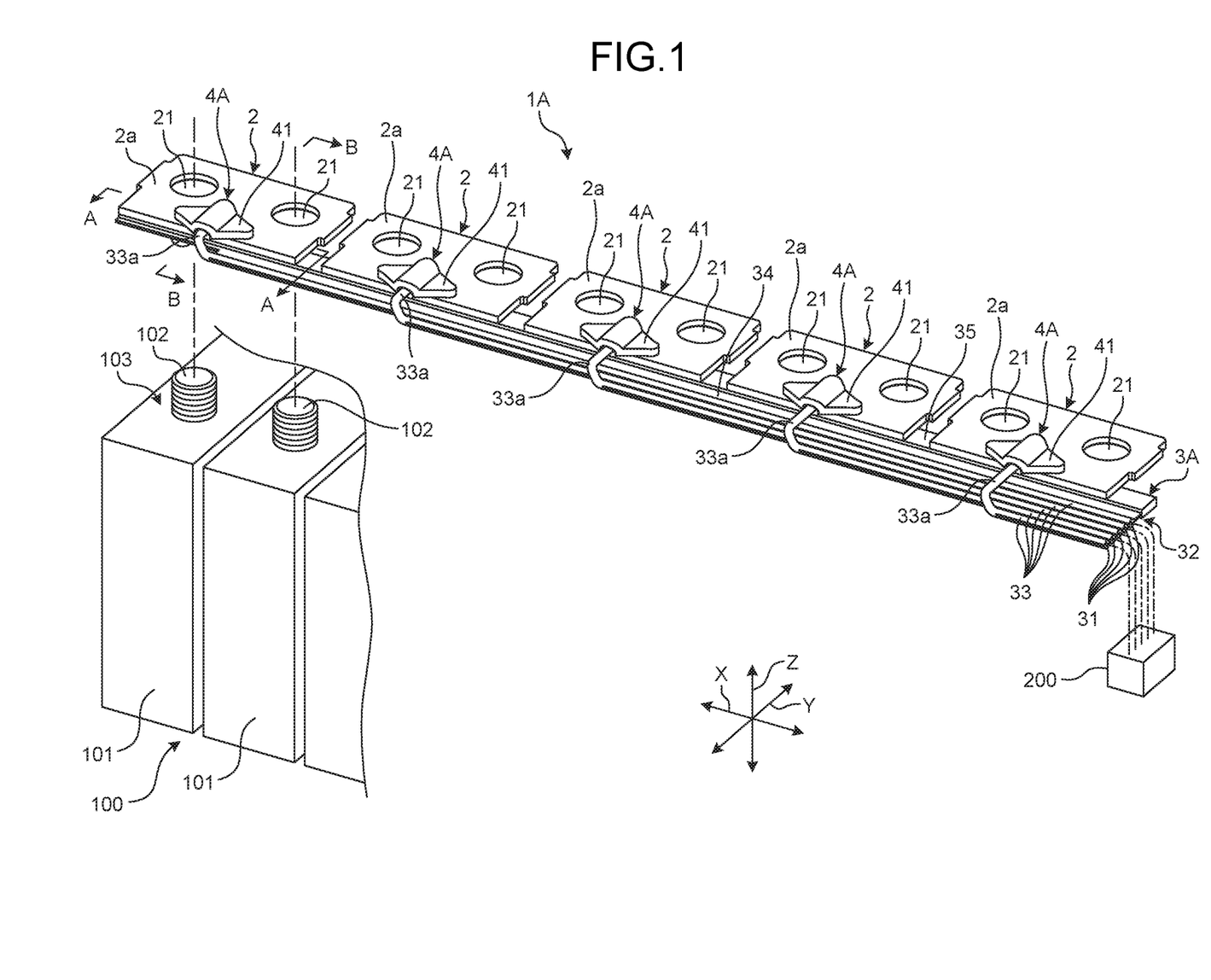
FIG. 1 is a perspective view illustrating a conductor module for terminal in accordance with a first embodiment.
Figure 2:
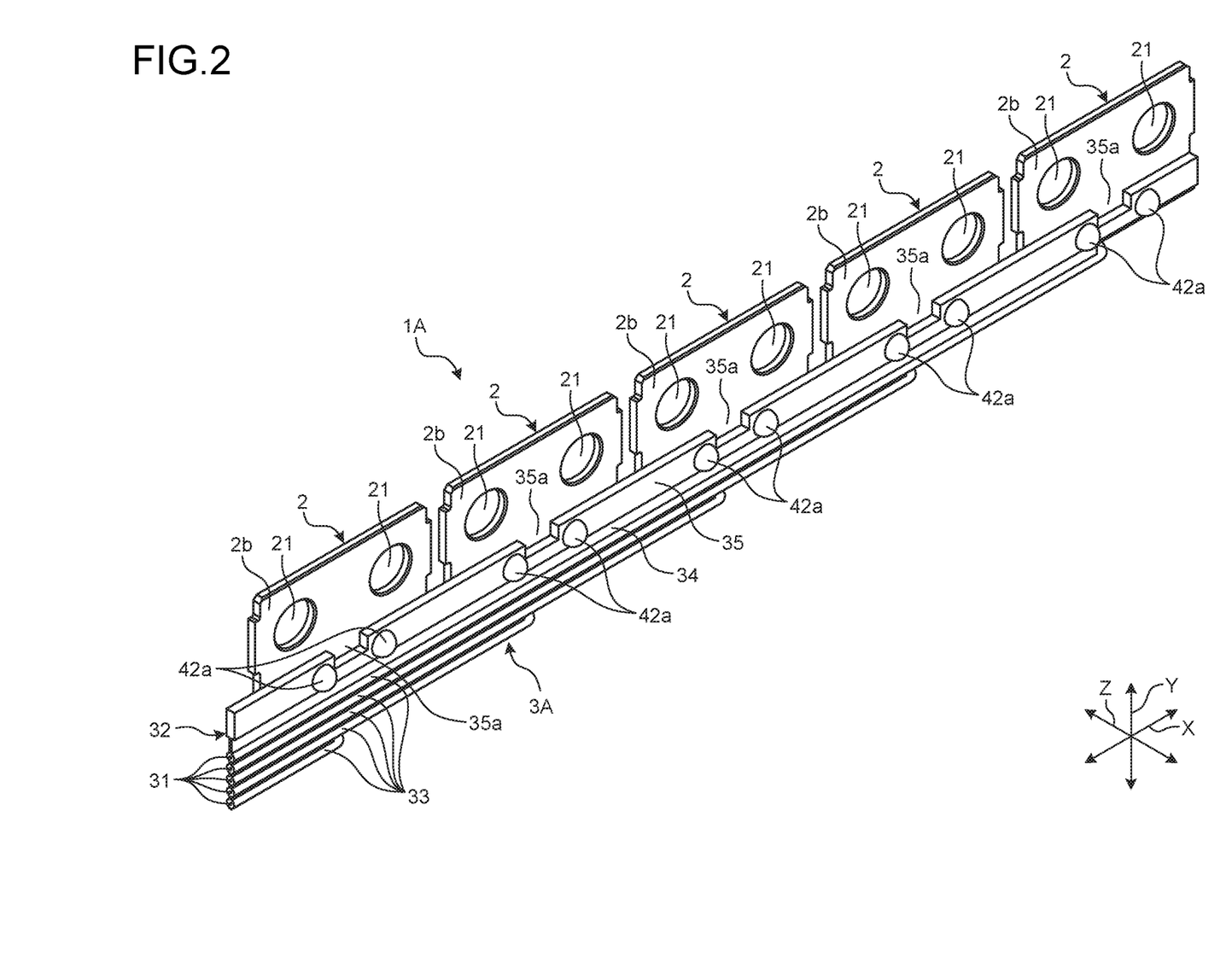
FIG. 2 is a perspective view illustrating the conductor module for terminal in accordance with the first embodiment.
Figure 3:
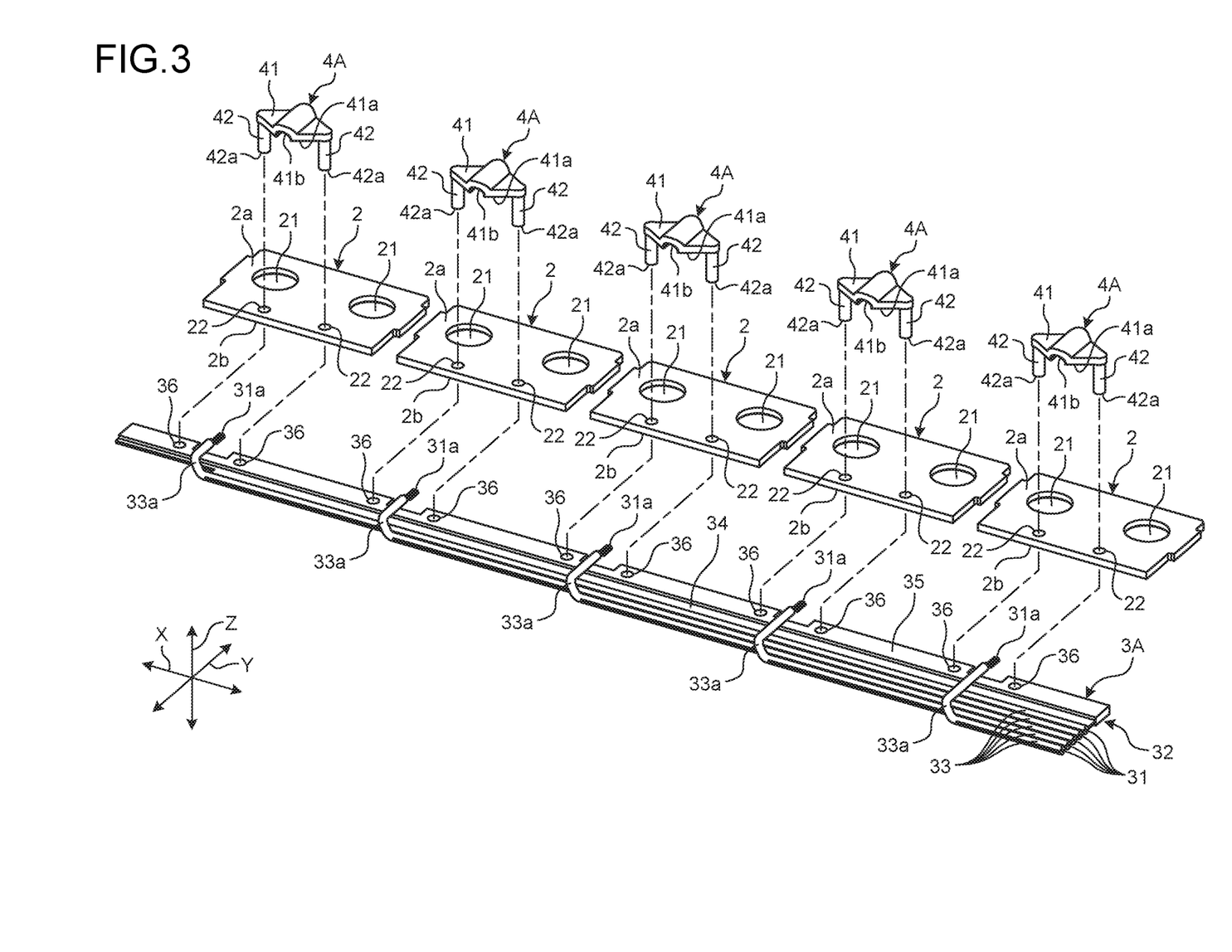
FIG. 3 is an exploded perspective view illustrating the conductor module for terminal in accordance with the first embodiment.
Figure 4:
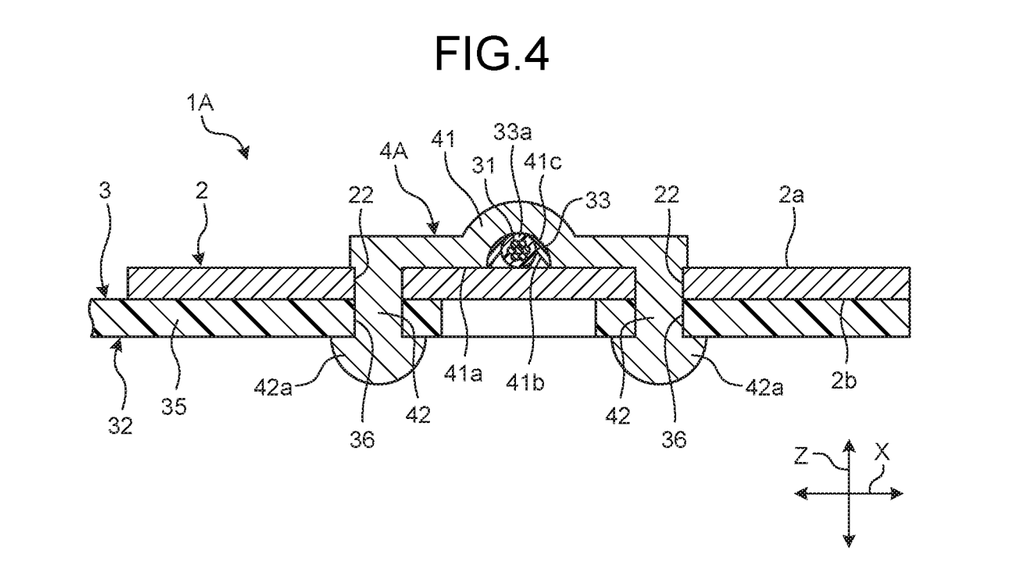
FIG. 4 is a sectional view illustrating a main part of the conductor module for terminal in accordance with the first embodiment.
Figure 5:
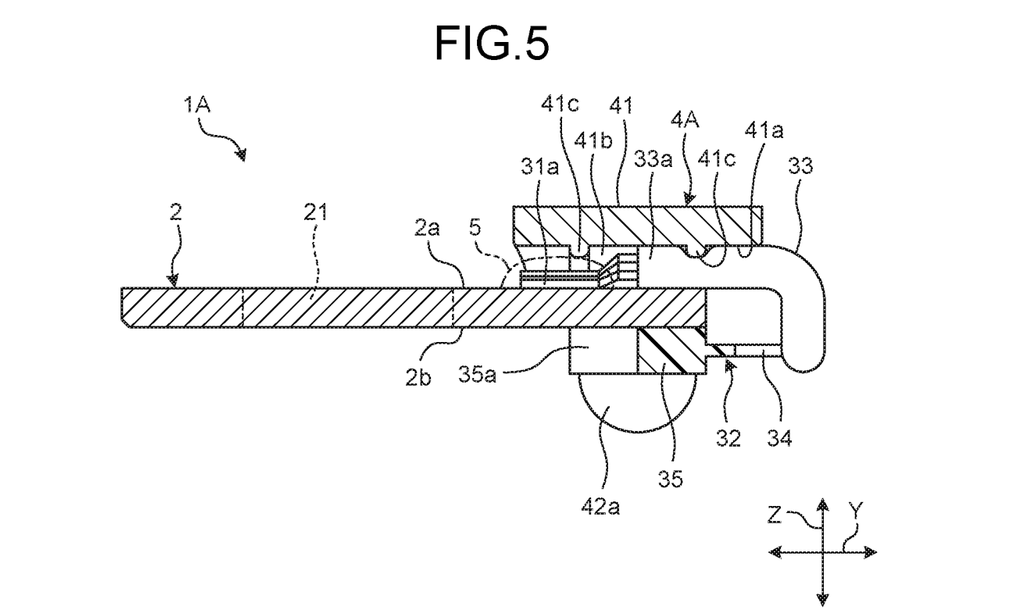
FIG. 5 is a sectional view illustrating a main part of the conductor module for terminal in accordance with the first embodiment.

A conductor module for terminal in accordance with a first embodiment will now be described. FIG. 1 is a perspective view illustrating the conductor module for terminal in accordance with the first embodiment. FIG. 2 is a perspective view illustrating the conductor module for terminal in accordance with the first embodiment. FIG. 3 is an exploded perspective view illustrating the conductor module for terminal in accordance with the first embodiment. FIG. 4 is a sectional view illustrating a main part of the conductor module for terminal in accordance with the first embodiment. FIG. 5 is a sectional view illustrating a main part of the conductor module for terminal in accordance with the first embodiment. FIG. 4 is a sectional view along line A-A of FIG. 1, and FIG. 5 is a sectional view along line B-B of FIG. 1. X direction in each of the drawings (including FIGS. 6 to 9) indicates an arrangement direction of electrode terminals and bus bars according to the embodiments. Y direction indicates a width direction of the conductor module for terminal according to the embodiments, and a direction orthogonal to the arrangement direction. Z direction indicates a vertical direction of the conductor module for terminal, and a direction orthogonal to the arrangement direction and the width direction.

As illustrated in FIG. 1, a conductor module for terminal 1A according to the embodiment is assembled to a battery module 100. The battery module 100 is formed by arranging a plurality of battery cells 101, for example, secondary batteries in the arrangement direction and modularizing them. The battery module 100 is mounted on, for example, electric vehicles (EVs) and hybrid vehicles (hybrid vehicles (HVs) and plug-in hybrid vehicles (PHVs)), and is used for supplying power to a rotating electrical machine serving as a drive source and storing (charging) power generated by the rotating electrical machine. For example, the battery module 100 can obtain high battery output depending on output required for a vehicle by connecting the battery cells 101 in series. Each of the battery cells 101 includes a pair of electrode terminals 102 (a positive electrode terminal and a negative electrode terminal) on both end parts in the width direction, and an electrode terminal group 103 that is formed of the electrode terminals 102 arranged in the arrangement direction is separated in the width direction and is formed in two rows in the battery module 100. In the battery module 100, the conductor module for terminal 1A is assembled to each of the electrode terminal groups 103, and the electrode terminals 102 (positive electrode terminals and negative electrode terminals) of the battery cells 101 are connected in series by the conductor module for terminal 1A. Each of the battery cells 101 according to the embodiment is disposed so that the electrode terminals 102 that are adjacent in the arrangement direction of the battery cells 101 that are adjacent in the arrangement direction can have different polarities.

The conductor module for terminal 1A is used for connecting the battery cells 101 in series, and as illustrated in FIGS. 1 to 3, includes a plurality of bus bars 2, a state detector 3A, and a plurality of fixing members 4A. The conductor module for terminal 1A detects, through the state detector 3A, a state of the battery cell 101 connected to each of the bus bars 2, in the embodiment, voltage information, and outputs the voltage information to a battery module monitoring unit 200. The battery module monitoring unit 200 is a state detecting device that detects a state of each of the battery cells 101, and, for example, monitors a state of each of the battery cells 101 based on voltage information and reports abnormality to a driver who is to detect abnormality of the battery cells 101. In addition, the battery module monitoring unit 200 can output the acquired voltage information to a battery electric control unit (ECU) that controls the battery module 100, and the battery ECU executes charging and discharging control and the like of the battery module 100 based on the voltage information.

Each of the bus bars 2 is a connection conductor, and is electrically connected to either of the two electrode terminals 102 in the battery cell 101 as illustrated in FIGS. 1 to 5. The bus bars 2 according to the embodiment are each directly connected to two electrode terminals 102 with different polarities that are adjacent in the arrangement direction of the two battery cells 101 that are adjacent in the electrode terminal group 103 arranged in a row. Each of the bus bars 2 is formed in a flat plate shape by, for example, a material having conductivity such as metal, and is, when seen from the vertical direction in the embodiment, formed in a rectangular plate shape having the arrangement direction as a longitudinal direction. Each of the bus bars 2 includes terminal holes 21 and fixing holes 22. The bus bars 2 are arranged in a row in the arrangement direction corresponding to the electrode terminal group 103 with the longitudinal direction of the bus bars 2 parallel to the arrangement direction.

The terminal hole 21 is a hole in which the electrode terminal 102 is inserted. The terminal hole 21 penetrates through a connection surface 2a and a fixed surface 2b facing each other in the vertical direction. The two terminal holes 21 according to the embodiment are formed for each bus bar 2 corresponding to the two connected electrode terminals 102, and are formed separately from each other in the arrangement direction. The bus bar 2 is fixed to the electrode terminals 102 by, for example, screwing an unillustrated nut to a screw groove formed on an end part projecting from the connection surface 2a side of the terminal holes 21, with the electrode terminals 102 inserted in the terminal holes 21.

The fixing hole 22 is a hole in which a fixing leg 42, which will be described later, of the fixing member 4A is inserted. The fixing hole 22 penetrates through the connection surface 2a and the fixed surface 2b facing each other in the vertical direction. The two fixing holes 22 according to the embodiment are formed for each bus bar 2, and are formed separately from each other in the arrangement direction. The two fixing holes 22 are formed in the arrangement direction with the state detector 3A placed on the bus bar 2 interposed between the two fixing holes 22. The two fixing holes 22 are formed closer to the state detector 3A than the terminal holes 21 in the width direction.

As illustrated in FIGS. 1 to 5, the state detector 3A electrically connects the electrode terminals 102 and the battery module monitoring unit 200 to each other through the bus bars 2. The state detector 3A includes detection conductors 31 and an insulator 32. The state detector 3A according to the embodiment is a flexible flat cable (FFC), and is integrally formed so that the detection conductors 31 can be covered with the insulator 32.

The detection conductor 31 electrically connects the bus bars 2 and the battery module monitoring unit 200 to each other. The plurality of detection conductors 31 according to the embodiment are each formed corresponding to the bus bars 2. Each of the detection conductors 31 has conductivity, is deformable, and is formed by collecting a plurality of element wires formed of, for example, copper or aluminum. In the detection conductor 31, one end part 31a is directly and electrically connected to the connection surface 2a, and the other end part is electrically connected to the battery module monitoring unit 200 through an unillustrated connector and the like. By preliminarily removing a part of a linear portion 33, which will be described later, of the insulator 32 covering the one end part 31a of the detection conductor 31, the detection conductor 31 is exposed from a tip 33a of the linear portion 33 to the outside. In the conductor module for terminal 1A, a connecting unit 5 is formed by directly and electrically connecting the one end part 31a to the connection surface 2a of each of the bus bars 2 on the connection surface 2a using ultrasonic bonding or resistance welding.

The insulator 32 covers the detection conductors 31. The insulator 32 has insulation properties, is elastically deformable, and is formed of, for example, a synthetic resin. The insulator 32 according to the embodiment includes a plurality of linear portions 33, a joint 34, a plate-shaped portion 35, and through-holes 36. The linear portions 33 cover the detection conductors 31, and the linear portions 33 are formed corresponding to the respective detection conductors 31. The linear portions 33 are each formed extending in the arrangement direction, and are arranged in a row in the width direction. Each of the linear portions 33 is joined to the adjacent linear portion 33 in the width direction. The tip 33a of each of the linear portions 33 is separated from the other linear portions 33, in other words, is independent, is bent from the arrangement direction to the width direction, and is placed on the connection surface 2a of each of the bus bars 2. In other words, a part of the state detector 3A is placed on the connection surface 2a of each of the bus bars 2. The joint 34 joins the linear portion 33 and the plate-shaped portion 35 to each other in the width direction, and is formed extending in the arrangement direction. The joint 34 according to the embodiment is, out of the linear portions 33, joined to the linear portion 33 closest to the bus bar 2 side in the width direction, and is, out of both end parts of the plate-shaped portion 35 in the width direction, joined to an end part on a linear portion 33 side. The plate-shaped portion 35 faces the fixed surface 2b in the vertical direction, and faces at least the fixing holes 22 in the vertical direction. The plate-shaped portion 35 according to the embodiment is formed extending in the arrangement direction so as to face the fixed surface 2b of each of the bus bars 2. In other words, each of the bus bars 2 is interposed between the linear portion 33 and the plate-shaped portion 35 in the vertical direction. The plate-shaped portion 35 has a notch 35a formed corresponding to each of the bus bars 2. The notch 35a causes anvil and electrode, which are unillustrated and used at the time of forming the connecting unit 5, to be made contact with an area on the fixed surface 2b, the area facing the detection conductor 31 placed on the connection surface 2a in the vertical direction. The through-hole 36 is a hole in which the fixing leg 42 is inserted. The through-hole 36 penetrates through the plate-shaped portion 35 in the vertical direction. The two through-holes 36 according to the embodiment are each formed corresponding to the fixing holes 22 in the bus bar 2, and are formed separately from each other in the arrangement direction.

As illustrated in FIGS. 1 to 5, the fixing member 4A fixes the state detector 3A to each of the bus bars 2. The fixing member 4A has thermoplasticity, and is formed of, for example, a synthetic resin. In other words, the fixing member 4A is plastically deformable by heating and applying an external force thereto. The fixing member 4A includes a main body 41 and the fixing legs 42.

The main body 41 is a part that the state detector 3A is made contact with. The main body 41 according to the embodiment has substantially a flat plate shape, and is, when seen from the vertical direction, formed in substantially a diamond shape having the arrangement direction as a longitudinal direction. On the main body 41, a facing surface 41a facing the connection surface 2a is formed. In a fixed state where the state detector 3A is fixed to each of the bus bars 2 by the fixing member 4A, the facing surface 41a is formed by having the vicinity of both end parts in the arrangement direction made contact with the connection surface 2a. In the main body 41, a center part in the arrangement direction is formed projecting to a side opposite to the connection surface 2a in the vertical direction, and a projecting part and a facing part in the vertical direction on the facing surface 41a are formed separately from the connection surface 2a. In other words, the main body 41 includes a state detector insertion space 41b (hereinafter, simply referred to as a "space 41b") that is formed of the facing surface 41a and the connection surface 2a on the center part in the arrangement direction. The space 41b is formed in substantially a semicircular arc shape when seen from the width direction, and is communicated with the outside in the width direction. A part of the state detector 3A is inserted in the space 41b, out of both end parts in the width direction, from an end part on the state detector 3A side. When seen from the vertical direction, the main body 41 covers the tip 33a of the linear portion 33 of the state detector 3A placed on the connection surface 2a and the one end part 31a of the detection conductor 31. On the main body 41, ribs 41c that each project from the facing surface 41a forming the space 41b to the state detector 3A side are formed. The ribs 41c according to the embodiment are a part of the main body 41, and the two ribs 41c are formed separately from each other in the width direction. While at least one of the ribs 41c is formed at a position facing the tip 33a of the linear portion 33 in the vertical direction in a fixed state. In the main body 41 according to the embodiment, a distance between the tip of the rib 41c (facing surface 41a) in the vertical direction and the connection surface 2a is made smaller than a diameter of the tip 33a of the linear portion 33 of the state detector 3A. Thus, the main body 41 in a fixed state is made contact with the state detector 3A with the tip 33a of the linear portion 33 that serves as the insulator 32 placed on the connection surface 2a being pressed to the connection surface 2a side by the rib 41c.

The fixing leg 42 is inserted in the fixing hole 22, and is restrained from being pulled out from the fixing hole 22 in a fixed state. The fixing leg 42 is formed projecting from the facing surface 41a of the main body 41 to the connection surface 2a side in the vertical direction. The two fixing legs 42 according to the embodiment are formed corresponding to the respective fixing holes 22 of the bus bar 2, and are formed separately from each other in the arrangement direction. The fixing legs 42 are inserted in the respective fixing holes 22 and the respective through-holes 36 from the connection surface 2a side, and are formed to have a tip 42a projecting to the fixed surface 2b side. Each of the fixing legs 42 is, before a fixed state, in other words, before the fixing leg 42 is heated and an external force works thereon, formed in a cylindrical shape with the tip 42a rounded as illustrated in FIG. 3, and the length of the fixing leg 42 in the vertical direction is made longer than the total depth of the fixing hole 22 and the through-hole 36 in the vertical direction. The fixing leg 42 is, in a fixed state, when seen from the axis direction of the fixing hole 22, in other words, from the vertical direction, is formed by having the tip 42a disposed on the outside in a radial direction than the fixing hole 22 and the through-hole 36. In the fixing leg 42 according to the embodiment, in a fixed state, when seen from the vertical direction, the tip 42a is formed in a semi-spherical shape including the outer periphery of a diameter larger than the diameter of the fixing hole 22 and the through-hole 36. In other words, the tip 42a is disposed so as to surround the outer periphery of the fixing hole 22 and the through-hole 36 when seen from the vertical direction.

The following describes assembling of the conductor module for terminal 1A. It is assumed that the tips 33a of the linear portions 33 of the state detector 3A are preliminarily separated from each other and the one end part 31a of each of the detection conductors 31 is exposed to the outside. As illustrated in FIG. 3, in order for the fixing hole 22 of each of the bus bars 2 to face the through-hole 36 of the state detector 3A corresponding to the fixing hole 22 in the vertical direction, an operator disposes the bus bar 2 and the state detector 3A so that the fixed surface 2b and the plate-shaped portion 35 can face each other. Subsequently, the operator places the tip 33a of the linear portion 33 on the connection surface 2a of the bus bar 2 to which the linear portion 33 corresponds, and makes the one end part 31a of the detection conductor 31 and the connection surface 2a is made contact with each other. Subsequently, the operator electrically connects the detection conductor 31 with respect to the connection surface 2a, and forms the connecting unit 5 on the bus bar 2. At this time, when seen from the vertical direction, the one end part 31a of the detection conductor 31 and the tip 33a of the linear portion 33 are disposed on the connection surface 2a. Subsequently, the operator brings the bus bar 2 close to the state detector 3A, and brings the fixed surface 2b of the bus bar 2 into contact with the plate-shaped portion 35. At this time, the fixing hole 22 is communicated with the through-hole 36 corresponding to the fixing hole 22.

In order for the fixing leg 42 of each of the fixing members 4A to face the fixing hole 22 of the bus bar 2 corresponding to the fixing leg 42 in the vertical direction, the operator disposes the fixing member 4A on the bus bar 2 so that the connection surface 2a and the facing surface 41a can face each other. Subsequently, the operator brings the fixing member 4A close to the bus bar 2 in the vertical direction. At this time, the fixing leg 42 is inserted in the fixing hole 22 from the connection surface 2a, is inserted in the through-hole 36, and projects from a side opposite to the fixing hole side of the through-hole 36 on the plate-shaped portion 35. The rib 41c of each of the main bodies 41 is made contact with the state detector 3A while the tip 33a of the linear portion 33 is pressed to the connection surface 2a side. Subsequently, the operator heats the fixing leg 42 that projects from the linear portion 33 and applies an external force to the bus bar 2 side in the vertical direction. For example, while heating a metal mold on which a transfer surface having the same shape as that of the tip 42a in a preliminary fixed state is formed, the operator presses the tip 42a before a fixed state to the bus bar 2 side in the vertical direction. In this manner, the tip 42a of the fixing leg 42 is plastically deformed so as to surround the outer periphery of the fixing hole 22 and the through-hole 36, is cooled, and maintains the state under ordinary temperature. The assembling of the conductor module for terminal 1A is ended, and a fixed state where the state detector 3A is fixed to the bus bar 2 by the fixing member 4A is implemented.

As described above, in the conductor module for terminal 1A according to the embodiment, in a fixed state, the tip 33a of the linear portion 33 that serves as the insulator 32 of the state detector 3A is fixed to each of the bus bars 2 by the fixing member 4A. In other words, in the conductor module for terminal 1A, while the state detector 3A is interposed between the main body 41 of the fixing member 4A and each of the bus bars 2, the fixing member 4A is fixed to the bus bar 2 by each of the fixing legs 42 of the fixing member 4A. The state detector 3A is restrained from moving with respect to the connection surface 2a in the arrangement direction, the width direction, and the vertical direction. Thus, in the case where an external force, for example, a force for pulling the one end part 31a of the detection conductor 31 electrically connected to the connection surface 2a on the connecting unit 5 to the extending direction of the detection conductor 31, a force for removing the one end part 31a of the detection conductor 31 on the connecting unit 5 from the bus bar 2 to a direction where the detection conductor 31 is separated from the bus bar 2, or the like, works on the state detector 3A, these forces for moving the one end part 31a of the detection conductor 31 from the connection surface 2a on the connecting unit 5 can be prevented from working because the state detector 3A is fixed to each of the bus bars 2 by the fixing members 4A. Thus, reduction in connection reliability of the conductor module for terminal 1A can be prevented. Because reduction in connection reliability of the conductor module for terminal 1A can be prevented, the conductor module for terminal 1A can maintain a desirable connection reliability without housing each of the bus bars 2 and the state detector 3A as the conductor module for terminal 1A and housing them in a housing case preventing the working of an external force.

The conductor module for terminal 1A according to the embodiment is, in a fixed state, formed by covering the one end part 31a of the detection conductor 31 on the connection surface 2a, in other words, covering the connecting unit 5 with the main body 41. Thus, the fixing member 4A in a fixed state can prevent an external force from directly working on the one end part 31a of the detection conductor 31 on the connecting unit 5. In this manner, the conductor module for terminal 1A can prevent an external force from working on the connecting unit 5, thereby preventing reduction in connection reliability of the conductor module for terminal 1A caused by damage or the like of the connecting unit 5.

In the conductor module for terminal 1A according to the embodiment, in a fixed state, the main body 41 of the fixing member 4A is made contact with the insulator 32 of the state detector 3A. In other words, the fixing member 4A can be made contact with the state detector 3A without being made contact with the one end part 31a of the detection conductor 31 on the connecting unit 5. Thus, the fixing member 4A in a fixed state does not allow a force for fixing the one end part 31a of the detection conductor 31 on the connecting unit 5 to work. In this manner, the conductor module for terminal 1A can prevent an external force from working on the connecting unit 5, and reduction in connection reliability of the conductor module for terminal 1A caused by damage or the like of the connecting unit 5 can be prevented.

In the conductor module for terminal 1A according to the embodiment, in a fixed state, the ribs 41c are made contact with the state detector 3A. As compared with a case where the facing surface 41a is made contact with the state detector 3A when no rib is formed, a contact area can be made smaller. In this manner, in the conductor module for terminal 1A, a pressing force per unit area when the ribs 41c of the main body 41 presses the connection surface 2a side against the tip 33a of the linear portion 33 can be made larger.

In the conductor module for terminal according to the present invention, in a fixed state, each of the fixing legs 42 of the fixing member 4A is inserted in a pair of the fixing holes 22 and the through-holes 36. Thus, the tip 33a of the linear portion 33 and the plate-shaped portion 35 are fixed to the bus bar 2 by the fixing member 4A. In the conductor module for terminal 1A, the state detector 3A can be strongly fixed to the fixing member 4A by the fixing member 4A. Because the plate-shaped portion 35 is fixed to each of the bus bars 2, the bus bar 2 can be, if the plate-shaped portion 35 is a fixed body, securely fixed to the fixed body by the fixing member 4A.

In the conductor module for terminal 1A according to the present invention, the fixing member 4A is formed of a synthetic resin having thermoplasticity. By heating and compressing the tip 42a before a fixed state toward the bus bar 2 side in the vertical direction, in a fixed state, when seen from the axis direction of the fixing hole 22, the tip 42a can be easily disposed on the outside in a radial direction than the fixing hole 22. In addition, in the conductor module for terminal 1A according to the present invention, by compressing the tip 42a before a fixed state toward the bus bar 2 side in the vertical direction using a heated metal mold, the tip 42a can be disposed so as to surround the outer periphery of the fixing hole 22 when seen from the axis direction of the fixing hole 22, and the fixing member 4A can be hardly pulled out against the bus bar 2 to a side opposite to the bus bar 2 side in the vertical direction. In this manner, the conductor module for terminal 1A can securely maintain a fixed state as well as can be easily assembled.

Figure 6:
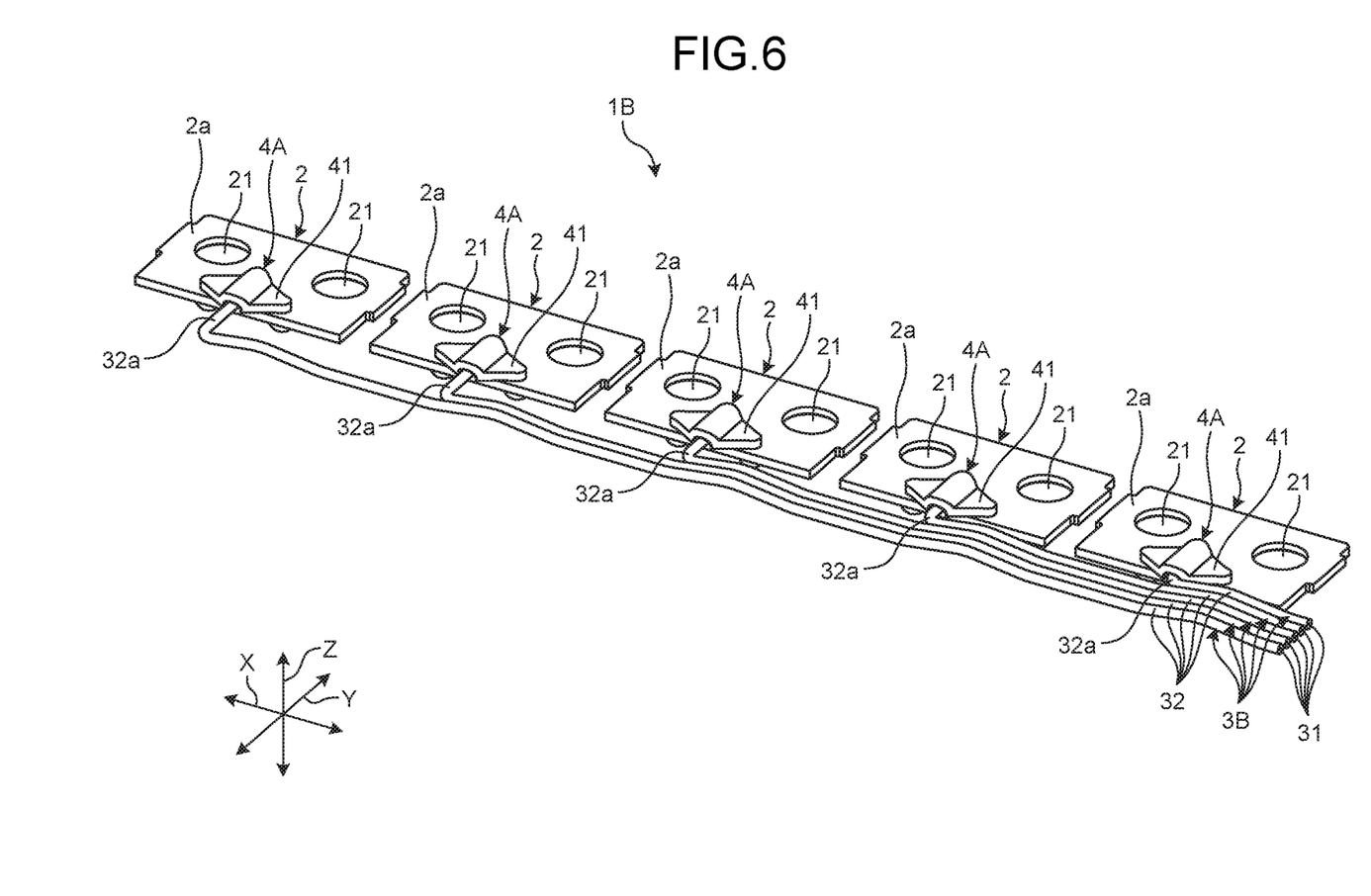
FIG. 6 is a perspective view illustrating a modification of the conductor module for terminal in accordance with the first embodiment.
Figure 7:
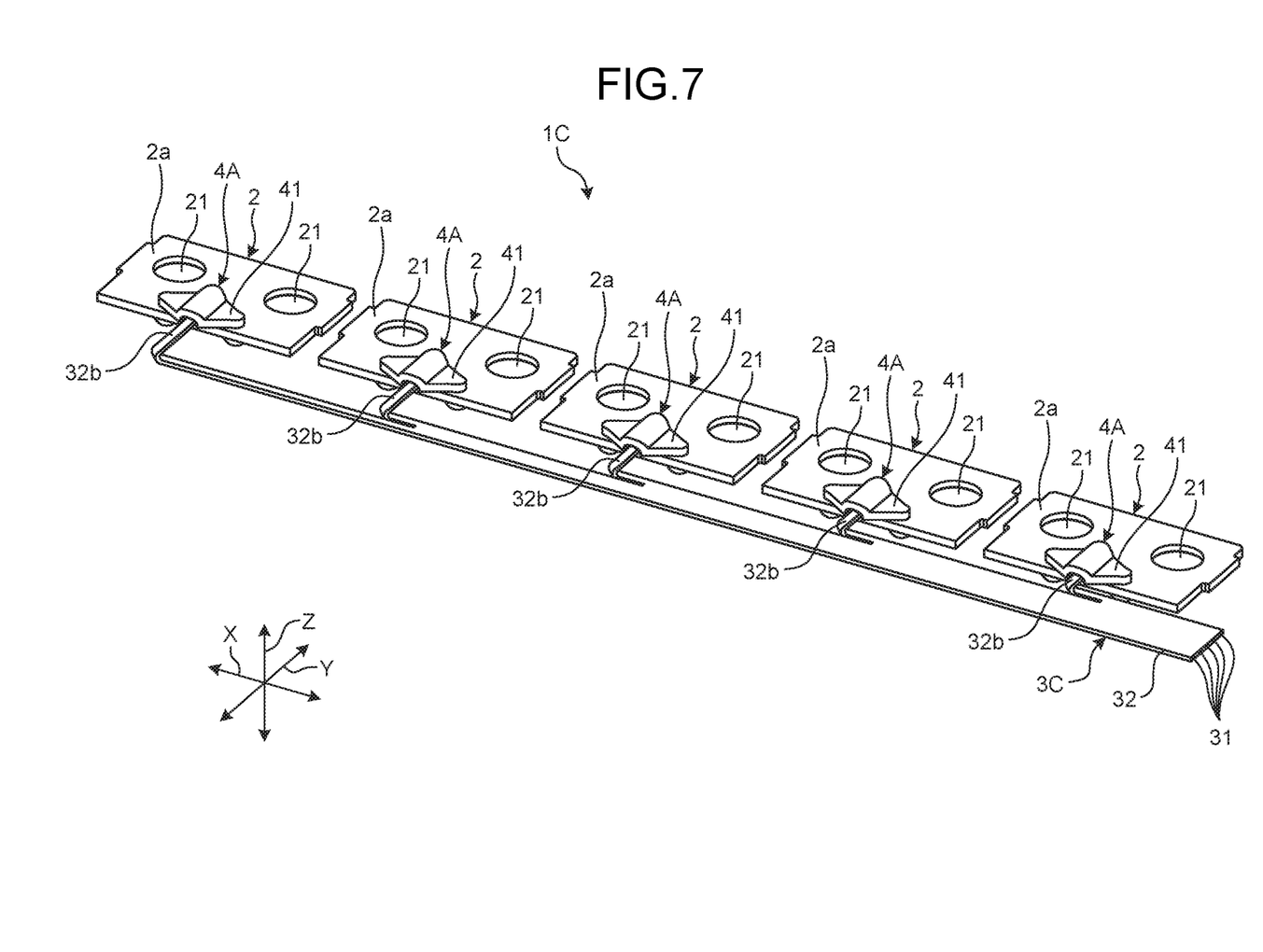
FIG. 7 is a perspective view illustrating a modification of the conductor module for terminal in accordance with the first embodiment.

In the conductor module for terminal 1A according to the embodiment, an FFC is used as the state detector 3A, but this is not limiting. Other configurations may be used if the detection conductors 31 are covered with the insulator 32. FIG. 6 is a perspective view illustrating a modification of the conductor module for terminal in accordance with the first embodiment. FIG. 7 is a perspective view illustrating a modification of the conductor module for terminal in accordance with the first embodiment. As illustrated in FIG. 6, a state detector 3B of a conductor module for terminal 1B according to the modification is an electric wire (FFC) corresponding to each of the bus bars 2, and is integrally formed so that the detection conductors 31 can be covered with the insulators 32. Each of the state detectors 3B is separated from the other state detectors 3B, in other words, is independent. A tip 32a of each of the insulators 32 is bent from the arrangement direction to the width direction, and is placed on the connection surface 2a of each of the bus bars 2. In a fixed state, the tip 32a of each of the insulators 32 is made contact with the ribs 41c of the main body 41 of the fixing member 4A. The one end part of each of the detection conductors 31 is exposed from the tip 32a to the outside, and is electrically connected to the connection surface 2a. By contrast, as illustrated in FIG. 7, a state detector 3C of a conductor module for terminal 10 according to the modification is a flat cable (FC), and is integrally formed so that the detection conductors 31 can be covered with the insulators 32. The detection conductor 31 has conductivity, is deformable, is a belt-shaped member formed of, for example, copper or aluminum, and is formed inside the plurality of insulators 32 corresponding to each of the bus bars 2. The insulators 32 cover each of the detection conductors 31, and are formed extending in the arrangement direction. Inside the insulators 32, each of the detection conductors 31 is arranged in a row in the width direction. In the insulators 32 in which each of the detection conductors 31 is formed, one tip 32b is separated from the other tips 32b, in other words, is independent, is bent from the arrangement direction to the width direction, and is placed on the connection surface 2a of each bus bar 2. In a fixed state, the tip 32b of each of the insulators 32 is made contact with the ribs 41c of the main body 41 of the fixing member 4A. The one end part of each of the detection conductors 31 is exposed from the tip 32b to the outside, and is electrically connected to the connection surface 2a.

Second Embodiment

Figure 8:
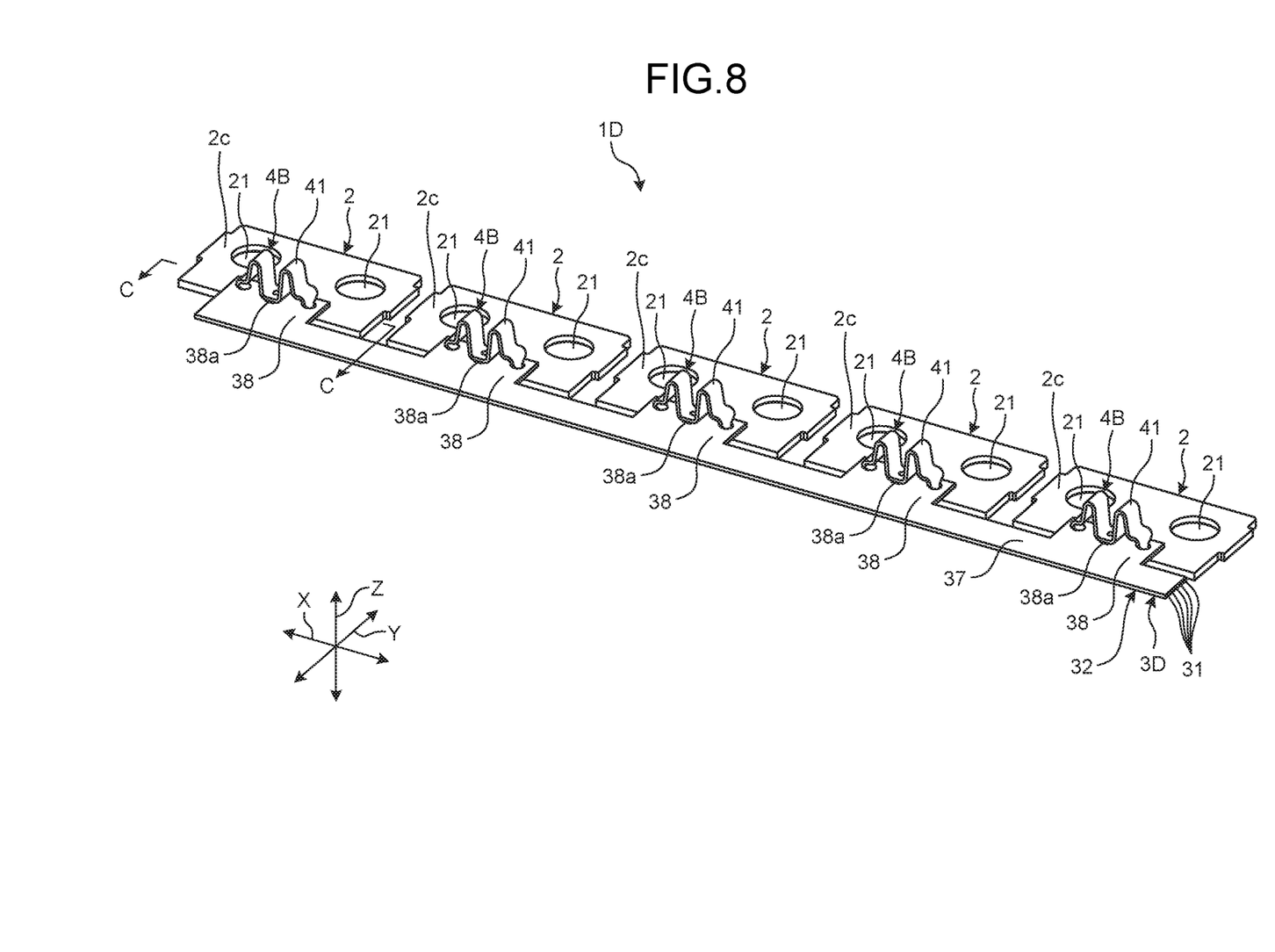
FIG. 8 is a perspective view illustrating a conductor module for terminal in accordance with a second embodiment.
Figure 9:
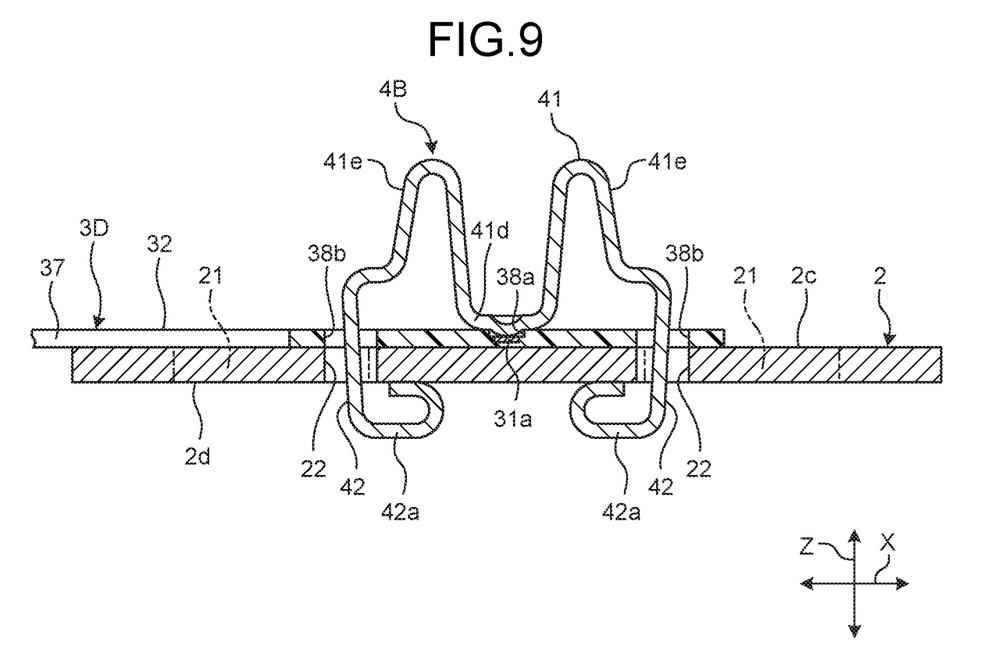
FIG. 9 is a sectional view illustrating a main part of the conductor module for terminal in accordance with the second embodiment.

A conductor module for terminal 1D in accordance with a second embodiment will now be described. FIG. 8 is a perspective view illustrating a conductor module for terminal in accordance with the second embodiment. FIG. 9 is a sectional view illustrating a main part of the conductor module for terminal in accordance with the second embodiment. FIG. 9 is a sectional view along line C-C of FIG. 8. The conductor module for terminal 1D according to the second embodiment is different from the conductor module for terminal 1A according to the first embodiment in that each of the bus bars 2 and a state detector 3D are connected to each other through fixing members 4B. Like numerals are assigned to like components as those of the conductor module for terminal 1A according to the first embodiment, and explanation thereof is omitted or simplified.

The conductor module for terminal 1D includes the plurality of bus bars 2, the state detector 3D, and the plurality of fixing members 4B as illustrated in FIGS. 8 and 9.

The bus bar 2 includes terminal holes 21 and fixing holes 22. The terminal hole 21 penetrates through a placing surface 2c and a connection surface 2d facing each other in the vertical direction. The fixing hole 22 is a hole in which the fixing leg 42 of the fixing member 4B is inserted, and penetrates through the placing surface 2c and the connection surface 2d facing each other in the vertical direction. The two fixing holes 22 according to the embodiment are formed for each bus bar 2, and are, when seen from the vertical direction, formed by overlapping placing portions 38, which will be described later, that are a part of the state detector 3D placed on the bus bars 2.

The state detector 3D electrically connects the electrode terminals 102 and the battery module monitoring unit 200 to each other through the bus bars 2 and the fixing members 4B. The state detector 3D includes the detection conductors 31 and the insulator 32. The state detector 3D according to the embodiment is a flexible printed circuit (FPC) board, and is integrally formed so that the detection conductors 31 can be covered with the insulator 32.

The plurality of detection conductors 31 are each formed corresponding to the bus bars 2. Each of the detection conductors 31 has conductivity, is deformable, is formed of, for example, copper and aluminum, and is wired as a printed circuit inside the insulator 32. In the detection conductor 31, one end part 31a is exposed from the insulator 32 to the outside and is directly and electrically connected to the fixing member 4B, and the other end is electrically connected to the battery module monitoring unit 200.

The insulator 32 is a deformable board, and includes a plate-shaped portion 37 and placing portions 38. The plate-shaped portion 37 covers each of the detection conductors 31, and is formed extending in the arrangement direction. Inside the insulator 32, each of the detection conductors 31 is arranged in a row in the width direction. The plurality of placing portions 38 are each formed corresponding to the bus bars 2, and are formed extending from an end part of the bus bar 2 side in the width direction to each of the bus bars 2 on the plate-shaped portion 37. Each of the placing portions 38 faces the placing surface 2c in the vertical direction, and faces at least the fixing holes 22 in the vertical direction. Inside each of the placing portions 38, the one end part 31a of each of the detection conductors 31 is formed. The placing portion 38 includes an aperture 38a and through-holes 38b. The aperture 38a is formed on a surface on a side opposite to the bus bar 2 side in the vertical direction on the placing portion 38. Because the one end part 31a of each of the detection conductors 31 is formed to the aperture 38a, the one end part 31a of the detection conductor 31 is exposed to the outside on a side opposite to the placing surface 2c side of the placing portion 38 by the aperture 38a. The through-hole 38b is a hole in which the fixing leg 42 is inserted. The through-hole 38b penetrates through the placing portion 38 in the vertical direction. The two through-holes 38b according to the embodiment are formed corresponding to the fixing holes 22 of the bus bar 2, and are formed separately from each other in the arrangement direction.

The fixing member 4B fixes the state detector 3D to each of the bus bars 2. The fixing member 4B has conductivity and elasticity, and is formed of metal, for example, aluminum or iron. The fixing member 4B is plastically deformable by applying an external force to the fixing member 4B. The fixing member 4B includes the main body 41 and the fixing legs 42.

The main body 41 is a part that the state detector 3D is made contact with. The main body 41 according to the embodiment has a flat plate shape, and includes, when seen from the width direction, a plurality of bending points. The main body 41 includes a contacting portion 41d and two elastic deformation portions 41e. The contacting portion 41d is made contact with the one end part 31a of the detection conductor 31 exposed to the outside while being pressed by elastic deformation of the fixing member 4B. In other words, the main body 41 is directly and electrically connected to the state detector 3D by the contacting portion 41d. The contacting portion 41d is formed on a center part in the arrangement direction of the main body 41. The elastic deformation portions 41e are elastically deformed so as to move the contacting portion 41d in the vertical direction. Each of the elastic deformation portions 41e is formed on both end parts of the main body 41 in the arrangement direction. When the elastic deformation portion 41e is seen from the width direction, the contacting portion 41d is joined to one end part, and the fixing leg 42 is joined to the other end part. The elastic deformation portion 41e is formed in a V shape having a peak on a side opposite to the placing portion 38 side in the vertical direction. In the main body 41, a width in the width direction is made larger than a diameter of the fixing hole 22. Thus, the main body 41 does not enter the fixing hole 22.

The fixing leg 42 is inserted in the fixing hole 22 and the through-hole 38b, and is restrained from being pulled out from the fixing hole 22 and the through-hole 38b in a fixed state. The fixing leg 42 is formed projecting from both end parts of the main body 41 to the placing portion 38 side in the vertical direction. The two fixing legs 42 according to the embodiment are formed corresponding to the fixing holes 22 and the through-holes 38b, and are formed separately from each other in the arrangement direction. Each of the fixing legs 42 is inserted in the fixing hole 22 and the through-hole 38b from the placing surface 2c side, and is formed by having the tip 42a projecting to the connection surface 2d side to which the fixing member 4B is electrically connected. The fixing leg 42 is, before a fixed state, before an external force works on the fixing leg 42, formed in a linear shape, and the length of the fixing leg 42 in the vertical direction is made longer than the total depth of the fixing hole 22 and the through-hole 38b in the vertical direction. By applying an external force to the fixing leg 42 in a fixed state, the fixing leg 42 is plastically deformed, and is, when seen from the axis direction of the fixing hole 22, in other words, from the vertical direction, formed by having the tip 42a disposed on the outside in a radial direction than the fixing hole 22 and the through-hole 38b. The fixing leg 42 according to the embodiment is, in a fixed state, when seen from the width direction, bent in a direction where the fixing legs 42 approach each other, and is made contact with the connection surface 2d. In other words, in the fixing leg 42, the tip 42a is bent inside, and the fixing member 4B is electrically connected to the bus bar 2 on the connection surface 2d.

The following describes assembling of the conductor module for terminal 1D. As illustrated in FIGS. 8 and 9, in order for the fixing hole 22 of each of the bus bars 2 to face the through-hole 38b of the state detector 3B corresponding to the fixing hole 22 in the vertical direction, an operator disposes the bus bar 2 and the state detector 3B so that the placing surface 2c and the placing portion 38 can face each other. Subsequently, the operator places the placing portion 38 on the placing surface 2c of the bus bar 2 to which the placing portion 38 corresponds, and makes the one end part 31a of each of the detection conductors 31 exposed to the outside via the aperture 38a. At this time, the fixing hole 22 is communicated with the through-hole 38b corresponding to the fixing hole 22. In order for the fixing leg 42 of each of the fixing member 4B to face the through-hole 38b of the placing portion 38 corresponding to the fixing leg 42 in the vertical direction, the operator disposes the fixing member 4B on the state detector 3B so that the aperture 38a and the contacting portion 41d can face each other. Subsequently, the operator brings the fixing member 4B close to the placing portion 38 in the vertical direction. At this time, the fixing leg 42 is inserted in the through-hole 38b from a side where the aperture 38a of the placing portion 38 is formed, is inserted in the fixing hole 22, and projects from the connection surface 2d of the bus bar 2. By elastically deforming the elastic deformation portion 41e, the contacting portion 41d of each of the main bodies 41 is made contact with the state detector 3B while the one end part 31a of the detection conductor 31 is pressed to the bus bar 2 side. Subsequently, the operator applies an external force in a direction where the fixing leg 42 approaches each other in the width direction to the fixing leg 42 projecting from the bus bar 2. For example, the operator applies an external force to the fixing leg 42 of the fixing member 4B at the same time using a preliminarily prepared fixing jig. In this manner, while the fixing member 4B is elastically deformed, the tip 42a of the fixing leg 42 is plastically deformed so that the contacting portion 41d can be pressed against the one end part 31a of the detection conductor 31. The assembling of the conductor module for terminal 1D is ended, and a fixed state where the state detector 3D is fixed to the bus bar 2 by the fixing member 4B is implemented.

As described above, in the conductor module for terminal 1D according to the embodiment, in a fixed state, each of the placing portions 38 of the state detector 3D is fixed to each of the bus bars 2 by the fixing member 4B. In other words, in the conductor module for terminal 1D, while the state detector 3D is interposed between the main body 41 and each of the bus bars 2, the fixing member 4B is fixed to the bus bar 2 by each of the fixing legs 42 of the fixing member 4B. Thus, reduction in connection reliability of the conductor module for terminal 1D can be prevented similarly to the conductor module for terminal 1A according to the first embodiment. In the conductor module for terminal 1D, each of the bus bars 2 and the state detector 3D are electrically connected to each other through the fixing member 4B, and the state detector 3D can be electrically connected to the bus bar 2 without forming the connecting unit 5. Thus, a process of assembling the conductor module for terminal 1D can be simplified and manufacturing cost can be reduced.

The first and second embodiments and modifications (hereinafter, referred to as "embodiments and the like") describe a case where the state detectors 3A to 3D are fixed to the plurality of bus bars 2 through the fixing members 4A and 4B, but this is not limiting. The state detectors 3A to 3D may be fixed to one bus bar 2 by the fixing member 4A or 4B.

The embodiments and the like describe a case where the bus bars 2 serving as a connection conductor are directly and electrically connected to the electrode terminals 102, but this is not limiting. For example, the connection conductor may be a component that is electrically connected to a bus bar directly and electrically connected to the electrode terminals 102. In other words, the connection conductor may be a component that is indirectly and electrically connected to the electrode terminals 102 through the bus bars 2.

The conductor module for terminals 1A to 1D according to the embodiments and the like may be housed in a housing case. In this case, each of the bus bars 2 is housed in a housing space formed along the arrangement direction in the housing case.

In the conductor module for terminals 1A to 1D according to the embodiments and the like, the connecting unit 5 of the detection conductor 31 and the bus bar 2 is formed by ultrasonic bonding and resistance welding, but this is not limiting. The connecting unit 5 may be formed by laser welding and soldering.

The first embodiment and modifications describe a case where the ribs 41*c* contact the state detectors 3A to 3C, but the main body 41 does not necessarily include the ribs 41*c*. In this case, in the main body 41, a maximum distance in the vertical direction between the facing surface 41*a* forming the space 41*b* and the connection surface 2*a* is made smaller than the diameter of the tips 33*a*, 32*a*, and 32*b* of the state detectors 3A to 3C.

In the first embodiment and modifications, the fixing members 4A are used, but the fixing members 4B may be used. In this case, the contacting portion 41*d* presses the tips 33*a*, 32*a*, and 32*b* of the state detectors 3A to 3C against the connection surface 2*a* by elastic deformation of the fixing members 4B.

The first embodiment and modifications describe a case where the main body 41 is made contact with the tips 33*a*, 32*a*, and 32*b* of the state detectors 3A to 3C, but this is not limiting. The main body 41 may contact the one end part 31*a* of the detection conductor 31 while contacting the tips 33*a*, 32*a*, and 32*b*.

In the conductor module for terminal according to the embodiment, a fixing member is fixed to a connection conductor by a fixing leg while a state detector is interposed between a main body of the fixing member and the connection conductor, thereby securely fixing the state detector to the connection conductor and preventing reduction in connection reliability of a detection conductor with respect to the connection conductor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conductor module for terminal comprising:
   at least one or more connection conductor that is electrically connected to either of two electrode terminals of a battery cell in a battery module including a plurality of the battery cells;
   a state detector that includes a detection conductor electrically connecting at least the one or more connection conductor and a state detecting device detecting a state of the battery cell to which the connection conductor is electrically connected to each other; and
   a fixing member that fixes the state detector to at least the one or more connection conductor, wherein
   the connection conductor includes: a connection surface on which a part of the state detector is placed and to which the detection conductor is electrically connected; a fixed surface that faces the connection surface; and at least two or more fixing holes that penetrate through the connection surface and the fixed surface and are formed with the placed state detector interposed between the at least two or more fixing holes,
   the state detector includes an insulator that covers the detection conductor,
   the insulator includes a plate-shaped portion facing the fixed surface,
   the plate-shaped portion has through-holes each corresponding to the fixing holes,
   the fixing member includes: a main body that the state detector is made contact with; and a plurality of fixing legs that each project from the main body and correspond to the respective fixing holes,
   each of the fixing legs that is plastically deformable by an external force, is inserted in corresponding one of the fixing holes from the connection surface side and projects from the fixed surface,
   in a fixed state where the state detector is fixed to the connection conductor by the fixing member, when seen from an axis direction of the fixing hole, a tip of the fixing leg is disposed on the outside in a radial direction with respect to the fixing hole, and
   each of the fixing legs is, in the fixed state, inserted in the fixing hole and the through-hole.

2. The conductor module for terminal according to claim 1, wherein
   the main body is made contact with the insulator in the fixed state.

3. The conductor module for terminal according to claim 1, wherein
   the main body has a rib formed on a facing surface facing the connection surface in the fixed state, the rib projecting at least to the state detector side.

4. The conductor module for terminal according to claim 2, wherein
   the main body has a rib formed on a facing surface facing the connection surface in the fixed state, the rib projecting at least to the state detector side.

5. The conductor module for terminal according to claim 1, wherein
   the fixing member is formed of a synthetic resin having thermoplasticity, and
   the tip is disposed so as to surround the outer periphery of the fixing hole when seen from the axis direction of the fixing hole.

6. The conductor module for terminal according to claim 2, wherein
   the fixing member is formed of a synthetic resin having thermoplasticity, and
   the tip is disposed so as to surround the outer periphery of the fixing hole when seen from the axis direction of the fixing hole.

7. The conductor module for terminal according to claim 3, wherein
   the fixing member is formed of a synthetic resin having thermoplasticity, and
   the tip is disposed so as to surround the outer periphery of the fixing hole when seen from the axis direction of the fixing hole.

8. The conductor module for terminal according to claim 4, wherein
   the fixing member is formed of a synthetic resin having thermoplasticity, and
   the tip is disposed so as to surround the outer periphery of the fixing hole when seen from the axis direction of the fixing hole.

9. A conductor module for terminal comprising:
   at least one or more connection conductor that is electrically connected to either of two electrode terminals of a battery cell in a battery module including a plurality of the battery cells;
   a state detector that includes a detection conductor electrically connecting at least the one or more connection conductor and a state detecting device detecting a state of the battery cell to which the connection conductor is electrically connected to each other; and
   a fixing member that fixes the state detector to at least the one or more connection conductor, wherein the connection conductor includes: a connection surface on which a part of the state detector is placed and to which the detection conductor is electrically connected; a fixed surface that faces the connection surface; and at least two or more fixing holes that penetrate through the connection surface and the fixed surface and are formed with the placed state detector interposed between the at least two or more fixing holes, the fixing member includes: a main body that the state detector is made contact with; and a plurality of fixing legs that each project from the main body and correspond to the respective fixing holes, each of the fixing legs that is plastically deformable by an external force, is inserted in corresponding one of the fixing holes from the connection surface side and projects from the fixed surface, in a fixed state where the state detector is fixed to the connection conductor by the fixing member, when seen from an axis direction of the fixing hole, a tip of the fixing leg is disposed on the outside in a radial direction with respect to the fixing hole, and when seen from an axis direction of the fixing hole, a diameter of the tip is larger than a diameter of the fixing hole.

10. The conductor module for terminal according to claim 9, wherein
the state detector includes an insulator that covers the detection conductor, and
the main body is made contact with the insulator in the fixed state.

11. The conductor module for terminal according to claim 9, wherein
the main body has a rib formed on a facing surface facing the connection surface in the fixed state, the rib projecting at least to the state detector side.

12. The conductor module for terminal according to claim 10, wherein
the main body has a rib formed on a facing surface facing the connection surface in the fixed state, the rib projecting at least to the state detector side.

13. The conductor module for terminal according to claim 9, wherein
the fixing member is formed of a synthetic resin having thermoplasticity, and
the tip is disposed so as to surround the outer periphery of the fixing hole when seen from the axis direction of the fixing hole.

14. The conductor module for terminal according to claim 10, wherein
the fixing member is formed of a synthetic resin having thermoplasticity, and
the tip is disposed so as to surround the outer periphery of the fixing hole when seen from the axis direction of the fixing hole.

15. The conductor module for terminal according to claim 11, wherein
the fixing member is formed of a synthetic resin having thermoplasticity, and
the tip is disposed so as to surround the outer periphery of the fixing hole when seen from the axis direction of the fixing hole.

16. The conductor module for terminal according to claim 12, wherein
the fixing member is formed of a synthetic resin having thermoplasticity, and
the tip is disposed so as to surround the outer periphery of the fixing hole when seen from the axis direction of the fixing hole.

17. A conductor module for terminal comprising:
at least one or more connection conductor that is electrically connected to either of two electrode terminals of a battery cell in a battery module including a plurality of the battery cells;
a state detector that includes a detection conductor electrically connecting at least the one or more connection conductor and a state detecting device detecting a state of the battery cell to which the connection conductor is electrically connected to each other; and
a fixing member that fixes the state detector to at least the one or more connection conductor and has conductivity and elasticity, wherein
the connection conductor includes: a placing surface on which a placing portion that is a part of the state detector is placed; a connection surface that faces the placing surface and to which the fixing member is electrically connected; and at least two or more fixing holes that penetrate through the placing surface and the connection surface and are formed with the placed state detector interposed between the at least two or more fixing holes,
the placing portion has through-holes each corresponding to the fixing holes formed and has the detection conductor exposed to the outside on a side opposite to the placing surface side,
the fixing member includes: a main body that includes a contacting portion contacting, in a fixed state where the state detector is fixed to the connection conductor by the fixing member, the detection conductor being exposed to the outside while being pressed by elastic deformation of the fixing member; and fixing legs that project from the main body and correspond to the respective fixing holes, and
each of the fixing legs that is plastically deformable by an external force, is inserted in corresponding one of the through-holes and corresponding one of the fixing holes and projects from the connection surface, and
when seen from an axis direction of the fixing hole, a tip of the fixing leg is disposed on the outside in a radial direction with respect to the fixing hole.

* * * * *